United States Patent [19]

Leonard et al.

[11] 4,251,302
[45] Feb. 17, 1981

[54] METHOD OF COATING, LOCATING AND MAINTAINING OPHTHALMIC SUPPORTS OF EYEWEAR PROPERLY POSITIONED WITH RESPECT TO THE EYES ON THE BRIDGE OF THE NOSE OF THE WEARER

[75] Inventors: James H. Leonard, Brookfield, Wis.; Courtland M. Henderson, Xenia, Ohio

[73] Assignee: Site-Tac, Inc., Xenia, Ohio

[21] Appl. No.: 49,809

[22] Filed: Jun. 18, 1979

[51] Int. Cl.³ .......................... G02B 7/02; B05D 5/10; B05D 1/02; B05D 1/28
[52] U.S. Cl. ...................... 156/60; 156/329; 156/334; 351/78; 351/122; 351/123; 351/131; 351/132; 351/139; 351/178; 427/162; 427/207.1; 427/208.4
[58] Field of Search .................. 156/329, 334, 60; 427/162, 207 R, 207 B, 207.1, 207.4; 351/78, 122, 123, 131, 132, 139, 178

[56] References Cited

U.S. PATENT DOCUMENTS

| 538,151 | 4/1895 | Busset | 351/123 |
|---|---|---|---|
| 619,163 | 2/1899 | Gieberich | 351/123 X |
| 2,561,402 | 7/1951 | Nelson | 351/123 |
| 3,582,193 | 6/1971 | Bogyos | 351/132 X |
| 3,758,202 | 9/1973 | Chunga | 351/124 X |
| 4,165,925 | 8/1979 | Donovan | 351/132 X |

Primary Examiner—James R. Hoffman

[57] ABSTRACT

A method of coating, locating and maintaining ophthalmic supports of eyewear properly positioned with respect to the eyes and on the bridge of the nose of the wearer. The method comprises the steps of coating selected ones at least of the skin-contacting surfaces of ophthalmic supports of eyewear with a non-toxic pressure-sensitive adhesive, properly positioning the ophthalmic support on the wearer with respect to the eyes and the bridge of the wearer's nose and forming a direct bond between the pressure-sensitive adhesive coated skin-contacting surfaces of the ophthalmic supports and the wearer's skin contacted thereby.

18 Claims, 9 Drawing Figures

U.S. Patent
Feb. 17, 1981
4,251,302
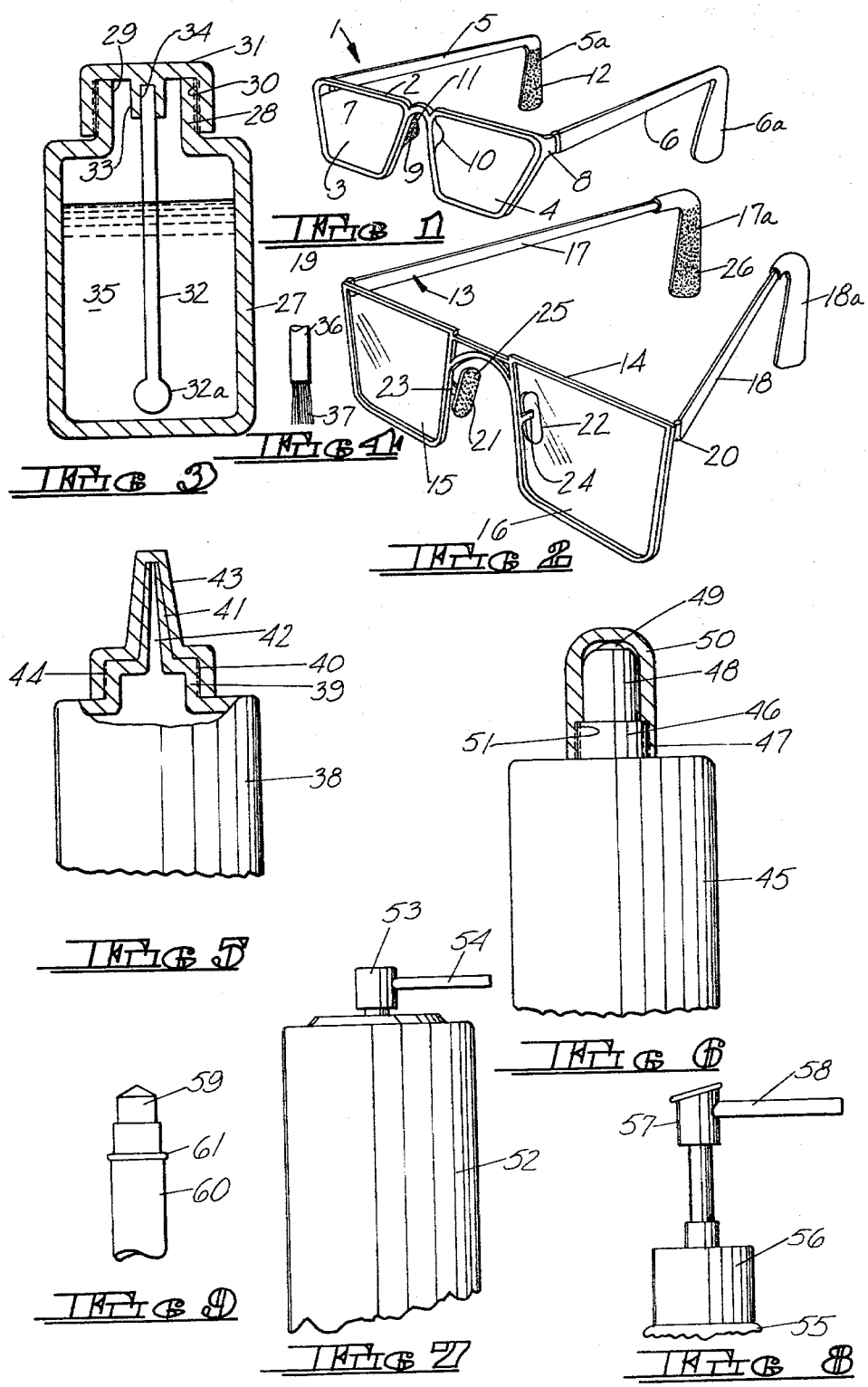

METHOD OF COATING, LOCATING AND MAINTAINING OPHTHALMIC SUPPORTS OF EYEWEAR PROPERLY POSITIONED WITH RESPECT TO THE EYES ON THE BRIDGE OF THE NOSE OF THE WEARER

TECHNICAL FIELD

The invention relates to a method of coating, locating and maintaining ophthalmic supports (nose pads and temple pieces) of eyewear in a proper position with respect to the pupils of the eyes and on the bridge of the nose of the wearer, and more particularly to methods of applying and using non-toxic pressure-sensitive adhesive to produce and maintain a direct bond between selected ones at least of the skin-contacting surfaces of ophthalmic supports and the wearer's skin.

BACKGROUND ART

While the method of the present invention is not intended to be so limited, for purposes of an exemplary showing it will be described in its application to conventional eyeglasses. As is recognized by persons who wear eyeglasses and by opticians, optometrists and ophthmologists who prescribe and fit eyeglasses, it is difficult during everyday use to keep eyeglasses in the proper position with respect to the pupils of the eye and on the bridge of the nose of the wearer. The maintaining of the proper position of eyewear on the nose is not only a matter of comfort, but is also necessary to obtain proper vision when the eyewear serves a corrective function. The problem is particularly acute for those who must wear bifocal, trifocal, or other multifocus types of eyeglasses that require percision alignment of the lenses with respect to the pupils of the eyes. This problem is accentuated during warm weather or when engaged in strenuous activities because perspiration has a tendency to lubricate the skin-ophthalmic support interfaces, causing the eyeglasses frequently to slip out of proper position.

Prior art workers have long recognized this problem and have pursued numerous approaches toward its solution. One approach is to provide an elastic O-ring or a metal or rubber spring at the points where the ear or temple pieces are hinged to the lens support frame. These devices cause the temple pieces to press against the head of the wearer yielding additional support to the eyewear. While helpful, this expedient is unsatisfactory for many due to the discomfort caused to the wearer by the pressure applied to the sides of the head by the temple pieces.

According to another approach, there is provided elastic or plastic cushioned nose and temple pieces that are affixed to or slipped on over the nose and temple pieces of the eyeglasses. Such devices have also not been completely satisfactory because they are unsightly and have a tendency to become slippery from contact with skin oils, perspiration, or water under conditions of high humidity, thereby losing much of their support capability. U.S. Pat. Nos. 538,151; 619,163; 2,561,402 and 3,582,193 teach exemplary forms of such devices.

Still another approach has been to attach thick, formed plastic, cushioned support pads to the nose pieces of the eyeglasses with pressure-sensitive adhesives or the like. The adhesives usually employing aromatic hydrocarbon solvents are applied to only one side of the pads and and are not intended for direct contact with the skin since such adhesives have a toxic effect on the sensitive skin of the nose and head. Additionally, such pads are unsightly and are subject to being lubricated by skin oils and/or perspiration.

An interesting approach is taught in U.S. Pat. No. 3,758,202. This reference describes additional support members attached to the lens frame portion of the glasses. The additional supports are provided with double-sided tape by which they may be secured directly to the face of the wearer. The support members are intended to take the place of the conventional temple pieces and even the nose bridge of the glasses may be eliminated. Such an approach to eyewear support is of course unsightly and difficult to use.

The present invention is based upon the discovery that the conventional ophthalmic support or frame of a pair of glasses may have some or all of its skin-contacting surfaces readily coated with a non-toxic, pressure-sensitive adhesive and that an unseen bond can be formed directly between these coated skin-contacting surfaces and the skin they contact. The adhesives contemplated by the present invention are not rapidly affected by natural skin oils, perspiration, water or the like under normal use conditions. The adhesives are non-toxic to the skin. The phrase "non-toxic" as used herein and in the claims is intended to refer to the fact that the adhesive, when in contact with the skin, will not have a harmful or adverse affect thereon.

The method of the present invention does not require the use of mechanical devices such as springs, O-rings, or the like. Nor does the method of the present invention rely on unsightly, preformed, manufactured pieces in the form of pads, shoes or the like which are slipped onto or affixed to the nose and/or temple pieces of the eyewear. Unlike the prior art, the method of the present invention does not rely upon an increased pressure on the skin or head of the wearer. The pressure-sensitive adhesives taught herein are resistant to natural skin oils, perspiration or water such as encountered under normal wear circumstances. The method of the present invention is particularly advantageous in the fitting and wearing of bifocal, trifocal and multifocal types of eyewear because it uses a thin adhesive layer which does not compress and which is not sufficiently thick to raise the eyewear above its normal fitted position on the nose or in a manner that would affect the focus of the eyewear.

Finally, the method of the present invention is comfortable for the wearer and the adhesives used are transparent or semi-transparent and are therefor virtually undetectable. In addition, the aesthetic or cosmetic appeal of the method of the present invention can be enhanced by the addition to the adhesive of an odorant, an anti-perspirant, or combinations thereof.

DISCLOSURE OF THE INVENTION

The invention relates to a method of coating, locating and maintaining ophthalmic supports (nose pads and temple pieces) of eyewear properly positioned with respect to the pupils of the eyes and on the bridge of the nose of the wearer. The method comprises the steps of coating selected ones at least of the skin-contacting surfaces of ophthalmic supports (e.g. nose pad and temple piece areas) with a non-toxic, pressure-sensitive adhesive which, when dry, is not readily affected by natural skin oils, perspiration or water under normal use. The adhesive is preferably allowed to dry but may be used while still wet if required. The eyewear is properly positioned on the bridge of the wearer's nose. A direct, but readily broken bond is thereafter formed between the pressure-sensitive adhesive-coated skin-contacting surfaces of the ophthalmic support and the wearer's skin contacted thereby.

The adhesives contemplated by the present invention are liquid and may be opaque or transparent before drying. After drying, the adhesives become transparent or semi-transparent. The adhesives are broadly applied in an amount such that their dried coating thickness on the opthalmic supports falls within the range of 0.0005 to 0.1 inches.

The adhesives may be applied in various ways including the use of a rod-like or brush-type applicator, a squeeze bottle or squeeze tube having an elongated cylindrical or conical nozzle, a conventional eye or nose dropper type dispenser, a rigid or squeeze-type bottle provided with a roll-on ball, a sponge or a felt pad, an aerosol dispenser, a pump dispenser or the like.

It is also within the scope of the present invention to provide the adhesive in the form of a solid gel-type stick. The adhesive stick is provided with a properly shaped tip and an appropriate container having a closure cap.

With usual use of the eyewear, the adhesive will be applied to selected areas or all of the skin-contacting surfaces of the ophthalmic support or frame one or more times daily, as needed to maintain proper eyewear position on the nose. Previously applied adhesive or adhesive inadvertently applied to or spilled on other parts of the ophthalmic support or the lenses of the eyewear can readily be removed by the use of an appropriate solvent, as will be described hereinafter.

BRIEF DESCRIPTION OF THE DRAWINGS

FIG. 1 is a perspective view of a conventional pair of glasses of the type having the well known plastic ophthalmic support or frame and illustrates the application of the adhesive to the skin-contacting surfaces thereof.

FIG. 2 is a perspective view of a conventional pair of glasses having the well known metallic ophthalmic support or frame with adhesive applied to the skin-contacting surfaces thereof.

FIG. 3 is a cross sectional elevational view of a container for the adhesive of the present invention, the container being provided with a rod-like applicator.

FIG. 4 is a fragmentary elevational view of a brush-type applicator for use with the container of FIG. 3.

FIG. 5 is a fragmentary elevational view, partly in cross section, illustrating a squeeze bottle or tube having an elongated dispensing nozzle and an overcap therefor.

FIG. 6 is a fragmentary elevational view, partly in cross section, illustrating a container provided with a contact-type dispensing means.

FIG. 7 is a fragmentary elevational view of an aerosol container for the adhesive of the present invention.

FIG. 8 is a fragmentary elevational view of a pump-type container for the adhesive of the present invention.

FIG. 9 is a fragmentary elevational view illustrating a solid gel-type adhesive stick of the present invention located in an appropriate container therefor.

BEST MODE OF CARRYING OUT THE INVENTION

Reference is first made to FIG. 1 illustrating a conventional pair of glasses having an ophthalmic support or frame (generally indicated at 1) made of plastic material, as is well known in the art. The frame 1 comprises a lens support portion 2 mounting lens 3 and 4, and a pair of temples 5 and 6 hingedly affixed to lens support portion 2 as at 7 and 8. The free ends 5a and 6a of temples 5 and 6 are normally intended to engage the wearer's head behind his ears. The lens support portion 2 of frame 1 is provided with a pair of integral nose pieces 9 and 10. In a conventional pair of glasses of the type shown in FIG. 1, the inside facing surfaces of nose pieces 9 and 10 constitute skin-engaging surfaces adapted to contact the skin at either side of the bridge of the wearer's nose. The inside facing surfaces of the free ends 5a and 6a of temples 5 and 6 are generally intended to contact the skin of the wearer behind his ears and constitute additional skin-contacting surfaces that may be coated to obtain an extra measure of eyewear support. According to the method of the present invention, it is some or all of these skin-contacting surfaces to which the non-toxic, pressure-sensitive adhesive is applied. To this end, in FIG. 1 the inside surface of nose piece 9 is shown with a layer of adhesive 11 applied thereto and the inside surface of the free end 5a of temple 5 is similarly shown with a layer of adhesive 12. It will be understood that similar adhesive layers can be applied to the inside surfaces (not shown) of nose piece 10 and the free end 6a of temple 6.

Reference is now made to FIG. 2 wherein another pair of conventional glasses is illustrated. In FIG. 2, the glasses are shown as having an ophthalmic support or frame generally indicated at 13 and made of metal, as is well known in the art. Once again, the glasses frame comprises a lens support portion 14 carrying lenses 15 and 16 and a pair of temples 17 and 18 hingedly affixed to the lens support portion 14 as at 19 and 20.

The temples 17 and 18 terminate in free ends 17a and 18a. While the free ends may simply constitute continuations of the metallic temples, it is also common practice to provide the free ends with rubber or plastic shoes as shown in FIG. 2. Finally, the lens support portion 14 of the ophthalmic support or frame 13 is provided with nose pieces 21 and 22 affixed to the lens support portion 14 by link elements 23 and and 24. The nose pieces 21 and 22 may be metallic, plastic, or the like. Alternatively, the nose pieces 21 and 22 may be metallic provided with a rubber or plastic coverings or shoes. Again, the inside facing surfaces of nose pieces 21 and 22 and the inside facing surfaces of the free ends 17a and 18 of temples 17 and 18 constitute the skin-engaging surfaces of the glasses frame of FIG. 2, some or all of which are to be coated with adhesive in accordance with the teachings of the present invention. For purposes of an exemplary showing the inside surfaces of nose piece 21 and free end 17a of temple 17 are shown having a layer of adhesive applied thereto as at 25 and 26, respectively. It will be understood that the similar inside surfaces of nose piece 22 and free end 18a of temple 18 can also be adhesive coated.

As indicated above, the conventional types of glasses illustrated in FIGS. 1 and 2 are exemplary only. The teachings of the present invention are equally applicable to specialized forms of eyewear such as safety glasses or the like. The glasses of FIGS. 1 and 2 may constitute regular or corrective sunglasses or ordinary corrective glasses. The nature of lenses 3 and 4 of FIG. 1 and lenses 15 and 16 of FIG. 2 does not constitute a limitation on the present invention. They may be corrective or non-corrective lenses. If corrective, they may be of the single or multifocus type.

It has been found that when glasses of the types illustrated in FIGS. 1 and 2 are used for ordinary wear, such a reading, housework and office work, they are readily held in place when only the skin-contacting surfaces of the nose pieces are coated with an adhesive in accordance with the teachings of the present invention. When the skin-contacting surfaces of the free ends of the temples are additionally provided with a coating of adhesive, the eyewear is even more firmly supported on the wearer. The coating of both the skin-contacting surfaces of the nose pieces and the free ends of the temples gives extra firm support for the glasses of wearers engaged in sports or other strenuous activities.

The selection of a proper pressure-sensitive adhesive is of utmost importance in the practice of the method of the present invention. The pressure-sensitive adhesive should be non-toxic or free of aromatic-hydrocarbons, halides, nitriles and similar types of solvents which may be either toxic to the skin or so water and oil soluble after curing or drying that adhesivness is quickly lost when the coatings are exposed to perspiration, skin oils or high humidity. The pressure-sensitive adhesive should release comfortably and cleanly from the skin without stringing or the like. Pressure sensitive adhesive formulations for use in the present invention must employ solvents such as water, hexane, ethyl alcohol, isopropyl alcohol or other similar liquids known to be safe in topical applications and capable of readily evaporating at ambient temperature or when in contact with the skin. The pressure-sensitive adhesive is preferably transparent or semi-transparent when dry, so as not to be unsightly in use.

Excellent results have been achieved after much searching and testing with a commercially available non-toxic pressure-sensitive adhesive constituting a hydrocarbon copolymer of vinyl acetate and vinyl acrylate water emulsion product. This product has been tested and found to possess the desired properties of a safe, functional, readily applied pressure-sensitive coating for ophthalmic support purposes. This product does not contain toxic aromatic hydrocarbons, nitriles, halides or other materials known to be harmful to the skin. In its emulsified state it is a milky white liquid that dries or cures under ambient conditions to a transparent, substantially invisible pressure-sensitive adhesive within a few minutes after application to the skin-contacting surfaces of the ophthalmic support. This product, when dry, is resistant to water, perspiration and natural skin oils and retains its adhesive characteristics in their presence. The degree of adhesiveness of this product is such that it provides a bond between the skin-contacting surfaces of the ophthalmic support and the skin contacted thereby that is quite adequate to hold the eyewear in position on the bridge of the nose and head of the wearer, even when the wearer is engaged in rather strenuous activities. Nevertheless, the adhesive bond between the ophthalmic support and the skin of the wearer can readily be broken with no discomfort by slowly removing the eyewear from the head and nose with a forward peeling motion of the eyewear from the nose.

The white color of the adhesive emulsion prior to drying is advantageous (although the emulsion may also be clear) in the achieving of a complete and proper coating of the ophthalmic support skin-contacting surfaces. Because of its white color, it is easy to visually determine the position, completeness and thickness of the adhesive coating being applied. The fact that the adhesive becomes transparent and essentially invisible as the solvent or emulsion suspension liquid evaporates not only gives a visual indication that the ophthalmic coating is ready for use, but quite importantly does not detract from the aesthetic or cosmetic appearance or design of the eyewear.

Tests were made, utilizing the hydrocarbon copolymer of vinyl acetate and vinyl acrylate water emulsion product described above, to determine the best thickness range for the adhesive coating applied to the ophthalmic support. A plurality of coatings of the adhesive, varying in thickness, was applied to the nose pieces of several types of eyewear and the coatings were permitted to dry. The thickness of each of the dried coatings was determined through the use of a conventional mechanical micrometer. Each coating thickness was rated for average ease of application, average appearance and average degree of support. The ease of application was rated on an arbitrary scale of 0-10 with the "0" being the most difficult to apply and "10" being the easiest to apply. Appearance was also judged on an arbitrary scale of 0-10, with "10" indicating that the coating was essentially transparent or invisible and "0" indicating that the coating was partially visible and uneven in thickness. The degree of support was also rated on a 0-10 scale with "0" indicating that the coating (or lack thereof) had no more support that would be available from an untreated pair of eyeglasses. A "10" rating indicated that the coating had a strong and long-lasting eyeglasses support function. The results are summarized in Table I below.

TABLE I

| Average Thickness of Dried Coating, Inches | Average Ease of Application Rating | Average Appearance | Average Degree of Support Rating |
| --- | --- | --- | --- |
| 0.000 | — | 10 | 0 |
| 0.0005 | 7 | 10 | 8 |
| 0.001 | 8 | 10 | 9 |
| 0.005 | 10 | 10 | 9 |
| 0.010 | 10 | 10 | 10 |
| 0.050 | 7 | 8 | 10 |
| 0.100 | 5 | 6 | 10 |
| 0.150 | 3 | 4 | 10 |
| 0.200 | 2 | 2 | 8 |

Table I shows that dried adhesive coating thicknesses ranging from about 0.0005 inch to about 0.100 inch are functional and satisfactorily increase the degree of support needed to keep eyeglasses in proper optical position on the nose and head of the wearer. A coating thickness greater than about 0.1 inch, while offering improved eyewear support relative to conventional methods and devices for supporting eyewear, is nevertheless difficult to apply and visible enough to be cosmetically unattractive. Coatings less than 0.0005 inch are less effective. The preferred range of dried coating thickness is from about 0.001 to about 0.05 inch.

A further series of tests with the water emulsion copolymer adhesive were run, showing that the bonding power to the skin of this pressure-sensitive adhesive can be decreased by increasing the percentage by volume of diluent or suspension fluid. Each test was run with an average coating thickness of 0.003 inch. Each coating formulation was tested for relative adhesiveness and drying time in minutes. The adhesiveness of the above described hydrocarbon copolymer of vinyl acetate and vinyl acrylate water emulsion product, as obtained, was used as a standard of 100. The relative adhesiveness of the other formulations tested was determined by measuring the relative weights required to pull and peel a 0.25 square inch aluminum plate (fitted with a small pan for holding weights) from each adhesive coating after it had dried on a 1 square inch area positioned at a 45° angle to the vertical. Drying time was determined as the number of minutes required to air dry the adhesive coatings, at ambient conditions, to the point where each coating was clear and remained intact (i.e., did not form strings) when a finger was touched to it and removed. The results of these tests are set forth in Table 2 below.

TABLE 2

| Formulation | Relative Adhesiveness | Drying Time Minutes |
|---|---|---|
| Copolymer Pressure-sensitive Adhesive, as commercially obtained | 100 | 8 |
| With 10% by volume water added | 95 | 8 |
| With 50% by volume water added | 85 | 8 |
| With 100% by volume water added | 75 | 8 |
| With 200% by volume water added | 65 | 8 |
| With 10% by volume methyl acetate added | 95 | 8 |
| With 50% by volume methyl acetate added | 90 | 7 |
| With 100% by volume methyl acetate added | 80 | 7 |
| With 200% by volume methyl acetate added | 70 | 6 |
| With 10% by volume ethyl alcohol added | 95 | 8 |
| With 50% by volume ethyl alcohol added | 85 | 8 |
| With 100% by volume ethyl alcohol added | 75 | 7 |
| With 200% by volume ethyl alcohol added | 65 | 7 |
| With 300% by volume ethyl alcohol added | 55 | 7 |
| With 10% by volume hexane added | 95 | 8 |
| With 50% by volume hexane added | 90 | 7 |
| With 100% by volume hexane added | 70 | 7 |
| With 300% by volume hexane added | 60 | 6 |

Isopropyl alcohol, heptane and mixtures thereof were also determined to be useful diluents and drying accelerators in additive quantities up to about 300% by volume. The full adhesiveness of this pressure-sensitive adhesive, as obtain, provided a tenacious holding of eyeglasses in place during strenuous physical activities. The lower adhesiveness achieved with high percentages of diluent provided adequate holding power under normal conditions of activity and permitted ready and comfortable removal of the spectacles from sensitive skin. Furthermore, the formulations made with liquids that were more volatile than water resulted in shorter drying times to that the coated eyewear could be worn more quickly than when water was the diluent or suspension liquid.

The results obtained with copolymers of vinyl acetate and vinyl acrylate teach that other non-toxic, transparent, oil-and water-resistant pressure-sensitive adhesives after curing or drying can be used to improve the performance of ophthalmic supports. Such pressure-sensitive adhesives include, but are not limited to, carboxylic elastomers, polyacrylates, polyvinyl ethers, natural and synthetic rubber latexes, and silicones (suspended in water, non-toxic alcohols, silicones or hydrocarbon liquids) with pressure-sensitive adhesiveness after drying can be used to improve the performance of opthalmic support devices on eyewear when the coatings are applied in thickness range of from 0.0005 to 0.1 inch.

In order for the use of a nontoxic pressure-sensitive adhesive to be effective, the coating on the skin-contacting surfaces of the eyewear will normally be renewed on a daily or several times per day basis. As a result, it is important that the pressure-sensitive adhesive be provided in a convenient packaging container that acts not only as a portable storage unit for the adhesive, but also as an applicator to put the coating of adhesive on the skin-contacting surfaces of the nose and temple pieces of the eyewear. The containers should be so sized as to permit their convenient use in applying the adhesive coating as described herein and to enable them to be carried in pocket or purse.

An exemplary container for the pressure-sensitive adhesive is illustrated in FIG. 3. The container comprises a vessel 27 having at its upper end a neck 28 defining a dispensing opening 29 for the vessel. The vessel may have any appropriate type of fluid-tight closure. For purposes of an exemplary showing, the vessel neck 28 is illustrated as being threaded as at 30 and provided with a threaded closure or cap 31. The vessel 27 is preferably of such size that it can be readily carried in purse or pocket.

A rod-like applicator 32 is mounted on the upper inside surface of the cap in any appropriate manner. In the example shown, the inside upper surface of cap 31 is provided with a downwardly depending lug 33 having an axial bore 34 therein adapted to receive the upper end of the rod-like applicator 32. The upper end of the applicator may enter the bore 34 with a force fit, or may be otherwise affixed within the bore 34 in any suitable manner. It will be understood that the vessel 27, cap 31 and rod-like applicator 32 can be made of any appropriate material so long as it is compatible with the adhesive 35 contained within the vessel.

The rod-like applicator 32 may be of uniform cross sectional dimension throughout its length. Alternatively, its free end may be shaped so as to have one or more flats formed thereon so as to terminate in an edge extending transversely of the long axis of the applicator, or so as to come to a point. For purposes of an exemplary showing, the applicator 32 is illustrated as having a spherical enlargement 32a formed at its free end. The length of the applicator 32 may vary. Thus, clearance between the free end of applicator 32 and the inside bottom surface of vessel 27 may range from contact to 50% of the inside height of vessel 27. The cross sectional configuration of applicator 32 may be rectangular, oval or round and preferably has a cross sectional area (perpendicular to its long axis) of from about 0.0005 square inches to about 0.25 square inches. The free end of the applicator could be provided with a plurality of bristles so as to constitute a brush-type applicator. In FIG. 4, such an applicator is fragmentarily shown at 36 having a brush-type free end 37.

FIG. 5 illustrates another exemplary embodiment of container for the liquid pressure-sensitive used in the practice of the present invention. In this embodiment, a squeeze vessel 38 is provided. The squeeze vessel 38 may either be a bottle made of resilient material or it may constitute a squeeze tube. The vessel 38 is provided with a hollow neck 39 threaded as at 40. The neck 39 terminates in an elongated applicator nozzle 41 having an axial bore 42. A cap 43 is provided, shaped to accommodate the nozzle 41 and being internally threaded at 44 so as to be engageable with the neck threads 40 to form a fluid-tight seal. Other engagements, well known in the art, between cap 43 and vessel neck 39 may be used, so long as a fluid tight seal is achieved.

In use, the vessel of FIG. 5 is squeezed so as to cause adhesive therein to exit via applicator nozzle 41 onto the skin-contacting surfaces of the ophthalmic support. The exterior surface of nozzle 41 may be used to uniformly spread the dispensed adhesive along the skin-contacting surfaces, before the adhesive dries.

While not required, the nozzle 41 is preferably tapered as shown. It has been determined that the uppermost discharge end of nozzle bore 42 should be of such size as to have an open or free area ranging from about 0.0002 square inch to about 0.04 square inches. If uppermost discharging end of axial bore 42 has an open or free area less than about 0.0002 square inch, it is impractical to extrude enough liquid adhesive therethrough to readily and properly coat the ophthalmic support surfaces with coatings that range from about 0.0005 inch to about 0.1 inch thick. On the other hand, when the discharge end of nozzle bore 42 has a free area greater than about 0.04 square inch, so much liquid adhesive is emitted therefrom that proper coating of the adhesive on the ophthalmic support is difficult. For convenience, the length of nozzle 41 should fall within the range of from about 0.1 inch to about 2.5 inches and preferably from about 0.25 inch to about 2 inches.

Another exemplary container for the adhesive employed in the method of the present invention is illustrated in FIG. 6. In this Figure a vessel is fragmentarily shown at 45 having a neck portion 46 threaded as at 47. The neck portion 46 has an upstanding extension 48 which supports a contact-type applicator 49. A closure cap 50 is provided, threaded as at 51 so as to form a fluid-tight seal with the threaded vessel neck 46.

The contact-type applicator 49, supported by neck extension 48 may constitute a sponge with small interconnecting pores. Alternatively, the applicator may constitute a felt pad or the like. In either event, it has been found that the applicator 49 should have a cross sectional area of up to about 0.42 square inches and preferably should have a cross sectional area in the range of from about 0.003 to about 0.3 square inches.

As yet another alternative, the contact-type applicator 49 may constitute a rotatable ball or sphere. When this is the case, the ball should be of a size to have a diametric cross section, or its equivalence, of from about 0.003 to about 0.42 square inches. When its diametric cross sectional area is less than about 0.003 square inches, insuffient liquid adhesive will be applied to the ophthalmic support surfaces. A diametric cross sectional area greater than about 0.42 square inches, however, will be awkward to use and allow too much liquid adhesive to flow to provide the desired adhesive coating on the skin-contacting surfaces of the ophthalmic support.

For best results and convenience, the overall length of vessel 45 from its bottom end (not shown) to applicator 49 should be from about 0.1 inch to about 4 inches and preferably from about 0.125 to about 2.5 inches. The extension 48 of neck 46 can be used to spread the dispensed liquid adhesive on the skin-contacting surfaces of the ophthalmic support. For this purpose, the extension 48 should have a length from about 0.25 inch to about 2 inches.

The vessel 45 may constitute a rigid wall vessel of any appropriate material compatible with the liquid adhesive to be contained therein. It has been found, however, that if the vessel 45 is of the resilient wall, squeeze-type, this is advantageous in causing the liquid adhesive to flow past or through the sponge, felt pad or ball, giving more positive control of the flow of the liquid adhesive during coating opertions.

The adhesive may be packaged in a conventional aerosol pressurized-type container as shown at 52 in FIG. 7. The container 52 is equipped with a well known form of push-buttom valve 53. The valve 53 may be provided with a hollow, elongated nozzle element 54, again as is known in the art. The nozzle element should have an inside cross sectional area of from about 0.0001 to about 0.02 square inch and should have a length of from about 0.25 to about 3 inches. The use of an applicator-container of the type shown in FIG. 7 has been found to permit adequate steady and directive feeding rates for the liquid adhesive onto the ophthalmic support skin-contacting surfaces.

It is also within the scope of the invention to provide the liquid adhesive in a pump-type applicator-container. Such containers are well known in the art. An exemplary container is illustrated in FIG. 8 which shows a vessel 55 provided with a screw-type or other cap 56 having a manually manipulable pump 57. The outlet of the pump 57 is again provided with an elongated nozzle-like applicator 58 similar to that shown at 54 in FIG. 7. The applicators 54 and 58 are preferably removable from their respective valve 53 and pump 57 for cleaning and storage.

In addition to liquid, non-toxic, transparent-when-dry, pressure-sensitive adhesives, it is possible to use non-toxic hydrocarbon polymers and rubber latexes to produce a solid or crayon type of wipe-on stick of adhesive that could be used to produce thin films of transparent adhesive coating on opthalmic supports. The same types of pressure sensitive adhesives (polyacrylates, polyvinyl ethers, silicones, etc . . . ) are incorporated into solid-forming non-toxic gels such as may be produced from water, glycerin, alkali stearates and gel-enhancing additives that are well known and identified in present state-of-the-art concerned with solid gel formulations.

As indicated above, non-toxic pressure-sensitive adhesives of the type empoyed by the method of the present invention can be provided in solid stick form. Such an adhesive is shown at 59 in FIG. 9. The uppermost end of the adhesive stick will preferably be shaped so that it can readily be used to apply a layer of the adhesive on the skin-contacting surfaces of the ophthalmic frame. The stick 59 may be located in a small container 60. The container may be provided with an annular flange 61 to serve as a stop for a protective overcap (not shown). The container 60 may also be provided with simple push means or screw means (both of which are well known in the art) to advance the adhesive stick 59.

A portable dropper type adhesive applicator like that well known in the art for dispensing nose and eye drops can also be used to coat the opthalmic support surfaces of eyewear with the non-toxic pressure-sensitive adhesives of this invention. The hollow tubular applicator can be equipped with an elastic bulb-type cap to permit drawing the adhesive into the tube or for dispensing it onto opthalmic support surfaces. The length of the tubular dispensor may vary. Thus, clearance between the dispenser bottom end of the applicator and the inside bottom surface of the storage vessel may range from contact to 50% of the inside height of the vessel. The preferred diametric cross sectional area at the outlet of the dispensing dropper tip shoud range from 0.0002 to less than 0.04 square inches. Care must be taken to apply coating of 0.0005 to 0.1 inch thickness to the opthalmic support areas.

As indicated above, it is preferred that the vessels of FIGS. 3 through 9 be of such size that they can conveniently be carried in pocket or purse. A vessel sized to contain about 5 cc (about 0.2 ounce) of the liquid adhesive has been found to provide up to about 100 days of daily applied coatings on an ophthalmic support. Larger containers, ranging in size up to about 100 cc in volume can be used as reservoirs, kept at home, in the automobile, and at the office to apply coatings and to refill smaller dispensing containers.

To make the non-toxic pressure-sensitive adhesive liquids and solids more acceptable and appealing to eyeglasses wearers, various odorants, perfumes and antiperspirants can be added to the adhesive formulations. It has been determined that perfumes and odorants that are soluble in alcohol, aliphatic hydrocarbon liquids and water would readily mix with the adhesive liquid and solid formulations. It has further been determined that as little as 0.1% by volume of an odorant beneficially affects the smell of the adhesive formulations and that as much as 15% by volume can be used without substantially harming the performance of the adhesive.

Antiperspirants, such as aluminum clorohydrate, a common reagent used in many liquid and solid deodorants, has been found to decrease the tendency for perspiration to form on the skin that comes in contact with the adhesive. From about 0.1% to about 15% by volume of a saturated solution of aluminum clorohydrate can be used to beneficially affect the resistance of the pressure-sensitive adhesives to loss of adherence when the wearer of the eyeglasses is perspiring.

To remove previously applied adhesive coatings or adhesives inadvertently applied to the lenses of the eyeglasses or non-skin contacting surfaces of the opthalmic support, it is only necessary to provide suitable solvents capable of removing the unwanted adhesive. Water, alcohols (e.g. ethyl and isopropyl alcohols), and non-toxic hydrocarbons (e.g. hexane, heptane and methyl acetate) have been determined to be well suited for this purpose and such solvents can be packaged in separate container-applicator type vessels such as those shown in FIGS. 1 through 8.

Modifications may be made in the invention without departing from the spirit of it.

What is claimed is:

1. A method of coating, locating and maintaining the opthalmic support of eyewear including an eyewear frame having a lens support portion and a pair of temples hingedly affixed thereto, said lens support portion having nose pieces with skin contacting surfaces, said temples having free ends with facing inside surfaces and the whole properly positioned with respect to the eyes on the bridge of the nose of the wearer, said method comprising the steps of coating selected ones at least of the skin-contacting surfaces of said opthalmic support with a coating having a thickness of 0.0005 inch to about 0.1 inch, said coating being devoid of a reinforcing substrate and comprising a non-toxic pressure-sensitive adhesive that is removable by selected solvents, properly positioning said coated opthalmic support on the wearer's nose and forming a thin and transparent directly bonded coating between said pressure-sensitive adhesive coated skin-contacting surfaces of the opthalmic support and the wearer's skin contacted thereby.

2. The method claimed in claim 1 wherein said adhesive coating on said selected ones at least of said skin contacting surfaces of said ophthalmic supports has a preferred thickness of from about 0.001 to about 0.05 inch.

3. The method claimed in claim 1 wherein said non-toxic pressure-sensitive adhesive comprises a liquid dryable at ambient conditions and when dry constituting a transparent or semitransparent coating resistant to water, perspiration and natural skin oils.

4. The method claimed in claim 1 including the step of adding to said non-toxic pressure-sensitive adhesive from about 0.01% by volume to about 15% by volume of a constituent chosen from the class consisting of a liquid odorant, a saturated solution of antiperspirant and mixtures thereof.

5. The method claimed in claim 1 wherein said pressure-sensitive adhesive comprises a topically non-toxic liquid of constituents chosen from the class consisting hydrocarbon polymers, hydrocarbon copolymers, silicone polymers and silicone copolymers suspended in a diluent chosen from water and the class consisting of hexane, isopropyl alcohol, denatured ethyl alcohol, methyl acetate, heptane and mixtures thereof, said adhesive being dryable at ambient conditions and when dry being resistant to water, perspiration and natural skin oils.

6. The method claimed in claim 1 wherein said pressure-sensitive adhesive is a water-based liquid chosen from the class consisting of a solution, a mixture, a liquid and a suspension of constituents chosen from the class consisting of hydrocarbon polymers, hydrocarbon copolymers, silicone polymers and silicone copolymers, said adhesive being dryable at ambient conditions and when dry being resistant to water, perspiration and natural skin oils.

7. The method claimed in claim 1 wherein said pressure-sensitive adhesive comprises a solid gel of constiuents chosen from the class of adhesives consisting of hydrocarbon polymers, hydrocarbon copolymers, silicone polymers, silicone copolymers and rubber latices.

8. The method claimed in claim 1 including the steps of providing said adhesive in a fluid tight vessel equipped with a rod-like applicator and applying said adhesive to said selected ones at least of said skin-contacting surfaces with said rod-like applicator.

9. The method claimed in claim 1 including the steps of applying said adhesive to said selected ones at least of said skin-contacting surfaces with a squeeze vessel containing said adhesive having an elongated tapered nozzle of a length of from about 0.1 to about 2.5 inches and a nozzle opening having a free area of from about 0.0002 to about 0.04 square inches, and spreading said adhesive thereon with the end and side of said elongated nozzle.

10. The method claimed in claim 1 including the steps of providing said adhesive in an applicator vessel having a neck portion supporting a contact applicator chosen from the class consisting of a felt pad, a sponge, a rotating applicator ball and an eye dropper style applicator, and applying said adhesive with said contact applicator.

11. The method claimed in claim 10 wherein said contact applicator comprises a sponge having a cross sectional area of from about 0.003 to about 0.42 square inches.

12. The method claimed in claim 10 wherein said contact applicator comprises a felt pad having a cross sectional area of from about 0.003 to about 0.42 square inches.

13. The method claimed in claim 10 wherein said contact applicator comprises a ball or spherical shape having a diametric cross sectional area of from about 0.003 to about 0.42 square inches.

14. The method claimed in claim 10 wherein said applicator comprises an eye dropper style applicator having an opening in the discharge end of the applicator with a diametric cross sectional area of from 0.0005 to 0.04 square inches.

15. The method claimed in claim 1 including the steps of providing said adhesive in an aerosol can provided with a manually actuable valve having an elongated tubular applicator of a length of from about 0.25 to about 3 inches and a dispensing opening having a free area of from about 0.0001 to about 0.02 square inches, and applying said adhesive to said selected ones at least of said skin-contacting surfaces with said tubular applicator.

16. The method caimed in claim 1 including the steps of providing said adhesive in a manually actuable pump dispenser having an elongated tubular applicator of a length of from about 0.25 to about 3 inches and a dispensing opening having a free area of from about 0.0001 to about 0.02 square inches, and applying said adhesive to said selected ones at least of said skin-contacting surfaces with said tubular applicator.

17. The method claimed in claim 1 wherein said selected ones of said skin-contacting surfaces comprise said skin-contacting surfaces of said nose pieces.

18. The method claimed in claim 1 wherein said selected ones of said skin-contacting surfaces comprise said skin-contacting surfaces of said nose pieces and said temple free ends.

* * * * *